(12) United States Patent
De Groot et al.

(10) Patent No.: US 6,548,606 B1
(45) Date of Patent: Apr. 15, 2003

(54) METHOD OF FORMING GRAFTED COPOLYMERS

(75) Inventors: Eleanor M. De Groot, Baltimore, MD (US); Martin L. Hess, Fulsher, TX (US); Robert B. Rhodes, Rockport, TX (US)

(73) Assignee: Infineum International Ltd. (GB)

( * ) Notice: Subject to any disclaimer, the term of this patent is extended or adjusted under 35 U.S.C. 154(b) by 0 days.

(21) Appl. No.: 10/055,125

(22) Filed: Jan. 23, 2002

(51) Int. Cl.[7] .............................. C08F 8/34; G08F 26/12
(52) U.S. Cl. ................ 525/332.7; 525/329.9; 526/263; 526/272
(58) Field of Search .................... 525/332.7, 329.9; 526/272, 263

(56) References Cited

U.S. PATENT DOCUMENTS

| | | | |
|---|---|---|---|
| 4,092,255 A | 5/1978 | Chapelet et al. | 252/50 |
| 4,146,489 A | 3/1979 | Stambaugh et al. | 252/50 |
| 4,292,414 A | 9/1981 | Saito et al. | 525/255 |
| 4,358,565 A | 11/1982 | Eckert | 525/280 |
| 4,506,056 A | 3/1985 | Gaylord | 524/445 |
| 4,780,228 A | 10/1988 | Gardiner et al. | 252/51 |
| 5,035,820 A | 7/1991 | Rhodes et al. | 252/50 |
| 5,073,600 A | 12/1991 | Gorman et al. | 525/264 |
| 5,141,996 A | 8/1992 | Zon et al. | 525/279 |
| 5,298,565 A | 3/1994 | Lange et al. | 525/279 |
| 5,523,008 A | 6/1996 | Boden et al. | 252/50 |
| 5,663,126 A | 9/1997 | Boden et al. | 508/221 |
| 5,703,256 A | * 12/1997 | Cusumano et al. | 554/224 |
| 5,814,586 A | 9/1998 | Boden et al. | 508/221 |

FOREIGN PATENT DOCUMENTS

| | | | | |
|---|---|---|---|---|
| WO | WO98/13443 | 4/1998 | | C10M/149/10 |
| WO | WO99/21902 | 5/1999 | | C08F/255/04 |

OTHER PUBLICATIONS

"Degradation and Cross–linking of Ethylene–Propylene Copolymer Rubber on Reaction with Maleic Anhydride and/or Peroxides", Gaylord et al., Journal of Applied Polymer Science, vol. 22, pp. 2549–2558 (1987).

* cited by examiner

*Primary Examiner*—James J. Seidleck
*Assistant Examiner*—Olga Asinovsky

(57) ABSTRACT

A process for preparing a grafted polymer in which a substrate polymer is graft reacted with a nitrogen-containing grafting monomer in the presence of a free radical initiator and an amide coupling inhibitor that reduces polymer crosslinking during the graft reaction.

17 Claims, No Drawings

METHOD OF FORMING GRAFTED COPOLYMERS

FIELD OF THE INVENTION

This invention is directed to an improved method of forming grafted copolymers. More specifically, the present invention is directed to a method of grafting nitrogen-containing monomers onto linear, radial or star-shaped copolymers with reduced cross-linking; and to lubricating oil compositions containing the resultant polymers.

BACKGROUND OF THE INVENTION

Lubricating oils for use in crankcase engine oils contain components that are used to improve the viscometric performance of the engine oil, i.e., to provide multigrade oils such as SAE 5W-30, 10W-30 and 10W-40. These viscosity performance enhancers, commonly referred to as viscosity index (VI) improvers include olefin copolymers, polymethacrylates, and styrene/hydrogenated diene block and star copolymers. Such polymeric materials are often referred to as "nondispersant VI improvers" because they do not prevent varnish and/or sludge in the oil from depositing on the internal surfaces of the internal combustion engine.

To prevent the deposition of sludge on engine parts, dispersants, commonly referred to as "ashless dispersants", are added to motor oils. These dispersants, which commonly have a nitrogen-containing polar head that associates with the sludge in the oil, and a long oil soluble tail portion, keep the sludge and varnish materials suspended in oil and prevent them from forming deposits within the engine. VI improvers can be provided with nitrogen-containing functional groups that impart dispersant capabilities to the VI improver. One trend in the industry has been to use such "multifunctional" VI improvers in lubricants to replace some or all of the dispersant.

Nitrogen-containing functional groups can be added to a polymeric VI improver by grafting a nitrogen-containing moiety onto the polymeric backbone of the VI improver. Processes for the grafting of a nitrogen-containing moiety onto a polymer are known in the art and include, for example, contacting the polymer and nitrogen-containing moiety in the presence of a free radical initiator, either neat, or in the presence of a solvent. The free radical initiator may be generated by shearing (as in an extruder) or heating a free radical initiator precursor, such as hydrogen peroxide.

However, the grafting of a nitrogen-containing moiety onto a polymeric backbone, particularly when extrusion grafting, both degrades the polymer and causes crosslinking between the polymer chains. Crosslinked polymer chains produce a number of undesirable properties in formulated motor oil. Highly crosslinked polymer chains do not dissolve in oil, and the crosslinked polymer must be filtered from the oil soluble polymer before use in the formulation of a lubricating oil. The oil insoluble, filtered material has no commercial value. Also, concentrates containing crosslinked polymers are often gelatinous at room temperature. This causes handling problems as such fluids do not flow, or flow with difficulty, under low shear conditions. Such crosslinked chains are also sensitive to shear and thereby provide lubricating oils in which the viscosity is highly dependent on the intensity of shearing to which the oil is subjected.

U.S. Pat. No. 5,141,996 discloses a process for the preparation of a grafted star polymer in which a nitrogen-containing polymerizable organic polar compound (e.g., 2-vinyl pyridine or 4-vinylpyridine) is contacted with a hydrogenated star polymers comprising a nucleus (e.g., a poly(-polyvinyl aromatic coupling agent) bearing polymeric arms of hydrogenated homopolymers, and copolymers of conjugated dienes; hydrogenated copolymers of conjugated dienes and mono-alkenyl arenes; or mixtures of the foregoing, in a mineral oil solvent, and in the presence of a free radical polymerization initiator and either a chain transfer agent, a pi-electron donor or a comonomer. The chain transfer agent, a pi-electron donor or a comonomer is described as acting as a coupling inhibitor. Suitable chain transfer agents are described as compounds containing an active hydrogen atom, such as long chain alkyl mercaptans. Anisole and N-vinylpyrrolidone are described as suitable pi-electron donors and comonomers, respectively. The presence of the chain transfer agent, pi-electron donor or comonomer was described as leading to a reduction in the degree of cross-linking between nitrogen-containing moieties.

WO 98/13443 describes a multifunctional viscosity index improver for lubricating oil compositions comprising a hydrogenated star-shaped polymer comprising a poly(-polyalkenyl coupling agent) nucleus and at least four polymeric arms linked to the nucleus. Five to ten N-vinyl imidazole functional groups are grafted onto each of the arms, which arms comprise hydrogenated homopolymers and copolymers of conjugated dienes, hydrogenated copolymers of conjugated dienes and monoalkenyl arenes, and mixtures thereof. Said star-shaped polymers are formed by a method in which the nucleus and polymeric arms are contacted, in a solvent, in the presence of a free radical initiator. It is further suggested that cross-linking between the N-vinyl imidazole groups can be minimized if the N-vinylimidazole is introduced prior to the free radical initiator.

WO 99/21902 discloses extruder grafting of N-vinylimidazole to an ethylene/propylene copolymer. One feature of the disclosed process is the use of a polar or non-polar solvent for either the grafting monomer or the initiator employed. It is alleged that the use of a polar solvent (preferably water) suppresses "undesirable side polymerization reactions".

In the process disclosed in U.S. Pat. No. 4,146,489, crosslinking that results from the grafting of vinylpyridine or vinylimidazole is controlled by post-degradation of the product in a gear pump, an extruder, or preferably, a homogenizer.

U.S. Pat. No. 4,292,414 describes a process for forming maleic anhydride-grafted block copolymers with reduced gelation, wherein grafting is performed in the presence of a "radical inhibitor", which can be a phenol compound, a phosphorous compound, a naphthol compound, an amine compound, a quinone compound or a sulfur compound. Preferred radical inhibitors are naphthylamine compounds, phenylenediamine compounds, mercaptoalkylamine compounds, N-nitrosoamine compounds, quinoline compounds and phenothiazine compounds.

U.S. Pat. No. 4,506,056 suggests that, in a process for the preparation of carboxyl-containing polymers (specifically methylmethacrylate grafted with maleic anhydride), crosslinking can be reduced by mixing together the methyl methacrylate, maleic anhydride, a free radical initiator and an additive that that inhibits the homopolymerization of maleic anhydride but not that of methyl methacrylate. Suitable "additives" include various nitrogen-, phosphorous- and sulfur-containing compounds. Suitable nitrogen-containing compounds include proprionamide, stearamide, ethylene bis(-stearamide), N-methylacetamide, N,N-dimethylformamide, N,N-dimethylacetamide, N,N-diethyl dodecanamide, N,N-diethyl-m-toluamide, caprolactam, 2-pyrrolidone, N-methylpyrrolidone, N,N-dimethylaniline and 2,6-dimethylpyridine-N-oxide. (See also *J Polymer Science,* Part A: Polymer Chemistry, Vol. 26, 1189–1198 (1988); *J. Polymer Science,* Polymer Letters, Vol. 20, 481–486 (1982) and *J. Polymer Science,* Polymer Letters, Vol. 21, 23–30 (1983), all to Gaylord and Mehta and *Degradation and Cross-linking of Ethylene-Propylene Copolymer Rubber on Reaction with Maleic Anhydride and/or Peroxides; J. Applied Polymer Science,* Vol. 33, 2549–2558 (1987) to Gaylord, Mehta and Mehta.

BRIEF SUMMARY OF THE INVENTION

The invention, in brief summary, is directed to a method of grafting nitrogen-containing grafting monomers to substrate polymers with a reduced occurrence of crosslinking. Specifically, the invention is directed to the discovery that the presence of certain amide compounds during grafting of nitrogen-containing grafting monomer reduces the tendency of the backbones to crosslink. In addition, the presence of certain amides has been found to improve the handling of pellets of the resulting grafted polymer by reducing blocking. The presence of these certain amides has also been found to reduce the viscosity of concentrates of the grafted polymers in oil, rendering such concentrates more pourable/pumpable at room temperature, and by reducing the haze associated with such concentrates. The improved oil concentrates are also less likely to gel at ambient temperatures. More specifically, the present invention provides a process for preparing grafted polymers, which method comprises contacting a nitrogen-containing polymerizable organic polar compound, or grafting monomer, with a substrate polymer in the presence of a free radical initator, an amide coupling inhibitor, and optionally, a diluent or solvent oil.

In a second aspect, the invention is directed to lubricating oil compositions containing multifunctional viscosity index improvers comprising polymer backbones onto which nitrogen-containing functional groups have been grafted.

DETAILED DESCRIPTION OF THE INVENTION

The base or substrate polymers suitable for functionalization and amination by the process of this invention include homopolymers and copolymers of alpha olefins containing from 1 to about 10 carbon atoms, hydrogenated homopolymers and copolymers of diolefins containing from 4 to about 12 carbon atoms, hydrogenated copolymers of one or more conjugated diolefins and one or more monoalkenyl aromatic hydrocarbons containing from 8 to about 16 carbon atoms and the like. The base polymer may be of a star or linear structure.

Hydrogenated polymers may be hydrogenated selectively, completely or partially. Selective hydrogenation refers to a process in which a substantial portion of the ethylenic unsaturations are hydrogenated, and all, or substantial portions of, the initial aromatic unsaturations are left unhydrogenated. Hydrogenated polymers of conjugated diolefins and copolymers of conjugated diolefins and monoalkenyl arenes are preferably hydrogenated selectively such that greater than about 95%, and preferably more than about 98% of the initial ethylenic unsaturation is removed by hydrogenation. Preferably, the hydrogenated polymers are substantially free of ethylenic unsaturation. In the case of tapered polymers (see A—A/B—B examples discussed infra), in addition to the 95%, and preferably greater than 98% hydrogenation to remove ethylenic unsaturation, between about 5% to about 35% of the aromatic unsaturations are preferably hydrogenated.

Polymers containing less than the above-noted amount of ethylenic unsaturation will, under certain conditions, exhibit excessive crosslinking during a functionalization reaction when the functionalization is completed in a blending apparatus capable of imparting high mechanical shear. Further, depending on the process conditions, scission of polymer chains may be increased, leading to excessive amounts of low molecular weight materials that provide poor thickening efficiency in the finished oil.

Useful hydrocarbon polymers include those prepared in bulk, suspension, solution or emulsion. As is well known, polymerization of monomers to produce hydrocarbon polymers may be accomplished using free-radical, cationic and anionic initiators or polymerization catalysts, such as transition metal catalysts used for Ziegler-Natta and metallocene type catalysts.

A wide range of molecular weight polymers can be utilized as the base polymer of the present invention. In general, the higher the molecular weight of the polymer, the less polymer will be required to achieve a given viscosity in a lubricating oil composition. The configuration of the polymer also affects the acceptable molecular weight.

The term "number average molecular weight", as used herein, refers to the number average weight as measured by Gel Permeation Chromatography ("GPC") with a polystyrene standard. In general, number average molecular weights of between about 200,000 and about 1,500,000 are acceptable, and between about 350,000 and about 900,000 are preferred, and between about 350,000 and about 800,000 are most preferred for the base polymer when the base polymer is a star-configuration hydrogenated polymer of one or more conjugated olefins or a star configuration polymer of one or more alpha olefins. When the base polymer is a star configuration copolymer containing more than about 3% by weight of monoalkenyl arenes, the number average molecular weight is preferably between about 350,000 and about 800,000.

When the base polymer is a copolymer of monoalkenyl arene and polymerized alpha olefins, hydrogenated polymerized diolefins or combinations thereof, the amount of monoalkenyl arene in the base polymer is preferably between about 5% and about 40% by weight of the base polymer. For such polymers, number average molecular weights between about 85,000 and about 300,000 are acceptable.

The minimum molecular weights preferred for functionalization and amination by the method of the present invention is also limited by the molecular weight necessary for the particular base polymer to be a solid at room temperature and atmospheric pressure. Normally liquid polymers: i.e., polymers which are liquid at standard temperature and pressure do not, generally, process well in blending equipment capable of imparting high mechanical energy such as an extruder. As a result, polymers having a molecular weight sufficiently high to be solid at standard temperatures and pressures will, generally, be used in the method of this invention. Moreover, it should be noted that chemical, thermal and shear degradation that occurs in the blending apparatus increases with increasing molecular weight of the polymer. The amount of degradation is significantly reduced with the method of this invention and, as a result, the method of this invention may be practiced with higher molecular weight polymers than has been practicable in the extruder processing of the prior art. Generally, however, the method of this invention will not be used with polymers having a sufficiently large molecular weight as to result in more than about 30% degradation of the polymer during the extruder grafting process.

Polymers acceptable as the base polymer of the present invention include homopolymers and copolymers of alpha olefins containing from 1 to about 10 carbon atoms, such as ethylene-propylene copolymers, as well as the hydrogenated derivatives of homopolymers and copolymers such as are described in U.S. Pat. Nos. 3,135,716; 3,150,209; 3,496,154; 3,498,960; 4,145,298 and 4,238,202. In general, the polymers taught by these patents may be polymers of one or more conjugated dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Preferred conjugated diolefins are those containing 4 to 8 carbon atoms. Moreover, one or more of the hydrogen atoms in the conjugated diolefins may be substituted with halogen. The polymers taught by these patents may also be copolymers of one or more of the aforementioned conjugated diolefins and one or more other monomers. Other monomers which may be used include aryl-substituted styrenes, alkoxy-substituted styrenes, vinyl naphthalene, alkyl-substituted vinyl naphthalenes and the like. The polymers taught by these references which may be hydrogenated and which would then be useful in the method of the present invention include random polymers, tapered polymers and block copolymers.

Polymers useful in the method of the present invention also include hydrogenated and selectively hydrogenated derivatives of block copolymers and tapered block polymers such as are taught, for example, in U.S. Pat. Nos. 3,231,635; 3,265,765; 3,322,856; 3,772,196; 5,223,579 and 5,278,252, which are incorporated herein by reference. Polymers which are acceptable as the base polymer further include hydrogenated and selectively hydrogenated derivatives of star-shaped polymers such as are taught, for example, in U.S. Pat. Nos. 4,033,888; 4,077,893; 4,141,847; 4,391,949 and 4,444,953. Methods for forming star shaped polymers are described, for example, in U.S. Pat. Nos. 4,116,917 and 4,156,673. Star-shaped polymers are alternatively referred to as radial polymers, and may also properly be called branched polymers.

Linear block copolymers, which are hydrogenated and then functionalized with the method of this invention may be represented by the following general formula:

$$A_z-(B-A)_y-B_x$$

wherein:
A is a polymeric block comprising predominantly monoalkenyl aromatic hydrocarbon monomer units;
B is a polymeric block comprising predominantly conjugated diolefin monomer units;
x and z are, independently, a number equal to 0 or 1; and
y is a whole number ranging from 1 to about 15.

Tapered linear block copolymers, which are selectively hydrogenated and then functionalized using the method of this invention, may be represented by the following general formula:

$$A-A/B-B$$

wherein:
A is a polymeric block comprising predominantly monoalkenyl aromatic hydrocarbon monomer units;
B is a polymeric block comprising predominantly conjugated diolefin monomer units; and
A/B is a tapered segment containing both monoalkenyl aromatic hydrocarbon and conjugated diolefin units.

Radial or star polymers which may be hydrogenated and then functionalized with the method of this invention, and are preferred, may be represented, generally, by the following general formula:

$$(B_x-(A-B)_y-A_z)_n-C;$$

and $$(B'_x-(A-B)_y-A_z)_{n'}-C(B')_{n''}$$

wherein:
A, B, x, y, and z are as previously defined;
n is a number from 3 to 30;
C is the core of the radial polymer formed with a polyfunctional coupling agent;
B' is a polymeric block comprising predominantly conjugated diolefin units, which B' may be the same or different from B; and
n' and n" are integers representing the number of each type of arm and the sum of n' and n" will be a number from 3 to 30.

As used herein in connect ion with polymer block composition, predominantly means that the specified monomer or monomer type which is the principle component in that polymer block is present in an amount of at least 85% by weight of the block.

Base polymers prepared with diolefins will contain ethylenic unsaturation, and such polymers will be hydrogenated prior to reacting the base polymers with an alpha-beta ethylenically unsaturated compound containing carboxyl or carboxyl derivative functionality in the process of this invention. When the polymer is hydrogenated, the hydrogenation may be accomplished using any of the techniques known in the prior art. For example, the hydrogenation may be accomplished such that both ethylenic and aromatic unsaturation is converted (saturated) using methods such as those taught, for example, in U.S. Pat. Nos. 3,113,986 and 3,700,633 or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and U.S. Pat. No. Re 27,145. Any of these methods could also be used to hydrogenate polymers which contain only ethylenic unsaturation and which are free of aromatic unsaturation.

Base polymers suitable for reaction may include mixtures of linear polymers as disclosed above, but having different molecular weights and/or different alkenyl aromatic contents as well as mixtures of star polymers having different molecular weights and/or different alkenyl aromatic contents. Alternatively, mixtures of star polymers and linear polymers having different molecular weights and/or different alkenyl aromatic contents may be used. The use of two or more different polymers may be preferred to a single polymer depending on the rheological properties the product is intended to impart when used to produce a formulated engine oil.

Specific nitrogen-containing grafting monomers that, when grafted, provide dispersing properties to polymers useful as VI improvers in lubricating oil compositions include N-vinylimidazole; 1-vinyl-2-pyrrolidinone; N-allylimidazole; 1-vinylpyrrolidinone; 2-vinylpyridine;

4-vinylpyridine; N-methyl-N-vinylacetamide; diallyl formamide; N-methyl-N-allyl formamide; N-ethyl-N-allyl formamide; N-cyclohexyl-N-allyl formamide; 2-methyl-1-vinylimidazole; 3-methyl-1-vinylpyrazole; N-vinylpurine; N-vinylpiperazines; vinylpiperidines; vinylmorpholines and aminopropylimidazole as well as combinations of those materials or other, similar materials. More broadly, any nitrogen-containing ethylenically unsaturated, aliphatic or aromatic monomers having from 2 to about 50 carbon atoms, as well as combinations of such monomers, are contemplated for use as graftable monomers herein. Of the noted nitrogen-containing graftable monomers, N-vinylimidazole is preferred. The amount of nitrogen-containing grafting monomer will depend, to some extent, on the nature of the substrate polymer and the level of dispersancy required of the grafted polymer. To impart dispersancy characteristics to both star and linear block copolymers, the amount of grafted nitrogen-containing monomer is suitably between about 0.4 and about 2.2 wt. %, preferably from about 0.5 to about 1.8 wt. %, most preferably from about 0.6 to about 1.2 wt. %, based on the total weight of grafted polymer.

Any of the free radical initiators known in the prior art to be effective in a grafting reaction of the type herein contemplated can be used as the free radical initiator in the method of this invention. Suitable free radical initiators include the various organic peroxides and hydroperoxides as well as the various organic azo compounds. Typical organic peroxides include benzoyl peroxide, t-butyl peroxypivalate, 2,4-dichlorobenzoyl peroxide, decanoylperoxide, propionyl peroxide, hydroxyheptyl peroxide, cyclohexanone peroxide, t-butyl-perbenzoate, dicumyl peroxide, lauroyl peroxide and the like. Typical hydroperoxides include t-butyl hydroperoxide and 2,5-dimethyl-2,5-di(butylperoxy)hexane. Typical organic azo initiators include 2,2-azobis(2-methylpropionitrile), 2,2-azobis(2-methylvaleronitrile), 4,4'-azobis(4-cyanovaleric acid) and the like. Particularly preferred free radical initiators include di t-butylperoxide; 1,1-bis(t-butyl-peroxy) 3,3,5-trimethylcyclohexane; t-butyl cumyl peroxide and 2,5-dimethyl-2,5-di(t-butylperoxy) hexane.

The amide coupling inhibitor is an amide selected from the group consisting of primary amides of saturated and unsaturated fatty acids, such as stearamide, palmitamide and oleamide. In addition to reducing crosslinking, oleamide has been found to best reduce the tendency of pellets formed with the grafted polymer to block. Further, the oleamide has been found to best lower the viscosity of concentrates containing the resulting polymer in oil. Also, to the extent that unreacted oleamide survives reaction conditions, it allows for production of non-hazy product pellets that are soluble when dissolved in oil. Still further, to the extent that unreacted oleamide survives reaction conditions, the oleamide is known to act as a friction modifier when used in lubricating oil. Friction reduction can improve lubricant fuel economy benefits. Therefore, the use of oleamide as the amide coupling inhibitor is preferred. To have an effect on cross-linking, the amide coupling inhibitor should be present, during the grafting reaction in an amount of 0.4 wt. % to 1.7 wt. %, preferably from 0.7 wt. % to 1.3 wt. %, most preferably from 0.9 wt. % to 1.1 wt. %, based on the weight of charged substrate polymer.

In general, any suitable liquid hydrocarbon may be used as the optional solvent or diluent for the polymer modified in accordance with the method of this invention. A liquid hydrocarbon will be a suitable diluent if it is compatible with olefin or polyolefin polymers but not compatible with aromatic hydrocarbon polymers. Such a diluent would tend to swell the olefin monomer portion of the polymer without affecting the aromatic hydrocarbon monomer portion of the polymer when the polymer contains an aromatic portion. The liquid hydrocarbon may be a pure compound but generally will be a blend of compounds such as would be contained in a petroleum distillate fraction. It is, however, important that the diluent remain liquid throughout the processing. It is, therefore, important that the diluent have a boiling point above the maximum temperature that will be encountered during the processing steps. Preferably, the diluent will be a neutral petroleum distillate fraction boiling generally in the fuel oil and/or lubricating oil boiling ranges. Most preferably, the diluent will have a specific gravity of about 0.9, an ASTM IBP of about 710° F. and an ASTM 90% boiling point of about 865° F.

In extruder grafting, the use of diluent oil is sometimes preferred. When used, the diluent oil is present in an amount between about 3% and about 15% by weight based on the base polymer. Preferably, the diluent oil is present in an amount between about 5% and 12% and most preferably between about 6% and 11% by weight. Lower amounts of diluent do not result in significant benefits over diluent-free processes. Higher levels of diluent result in lower efficiencies of the functionalization and amination reactions. Lower reaction efficiency results in unreacted reactants being present in the product composition. These reactants are generally undesirable components in the product compositions. Higher amounts of diluent oil also needlessly dilute the finished product, resulting in high costs, higher volumes, more cold flow and more difficult handling without advantage.

The polymer, diluent, free radical initiator nitrogen-containing graftable monomer and coupling inhibitor are contacted at a temperature and pressure sufficient to insure that both the polymer and the graftable monomer are in the liquid or molten phase when the reaction occurs. The reactants are preferably contacted in a blending device capable of imparting high mechanical energy such as an extruder, a Banbury mixer, a sigma blade mixer and the like. These devices are referred to herein as extruders.

Generally, the process for producing functionalized polymer proceeds as follows: polymer crumb and primary amide are loaded into the feed hopper of an extruder. The feed hopper provides crumb to the extruder feed throat at a set rate. As the crumb begins to melt in the extruder, the grafting monomer is fed into the extruder barrel via an injection system. The monomer, usually in solvent, is melt mixed with the polymer through an injection port and the organic peroxide, usually in diluent oil, is fed into the extruder through a second downstream injection port. The polymer melt subsequently passes a vacuum vent where unreacted reagent and volatile byproducts are removed. The polymer is then fed through a die plate and pelletized under water before being subjected to dewatering, drying and packaging. Extruder barrel temperature, screw speed, free radical initiator and monomer concentrations are all factors affecting product composition. Depending on the conditions employed, not all monomer will react, and monomer, as well as byproducts, is recovered through the reaction vent. Preferably, the grafting functionalization is performed in the presence of from about 0.02 to about 1 wt. %, relative to the weight of the polymer substrate, of a free radical initiator.

For heterocyclic amine monomer N-vinyl imidazole, an acetone solution can be used to introduce the monomer to the extruder. Depending on extruder conditions, it is also sometimes possible to add the monomer to the extruder without solvent. The peroxide initiator may be added in diluent oil. A 50/50 weight ratio of initiator to diluent oil is used generally, although other ratios are not excluded. The coupling inhibitor may be pre-blended with the polymer crumb before introducing the crumb into the hopper.

The process for preparing the grafted polymers may be carried out at a temperature between about 200° C. and 275° C., but is preferably between about 220° C. and about 250° C., with grafting at about 225° C. to about 240° C. giving optimal results with respect of the shear loss characteristics of the final product. The temperature in the inlet zone or zones in which the feed materials are introduced to the extruder will generally be maintained at a temperature below the main reaction zone temperatures to maximize mixing before the reaction rate is optimized by temperature increase. Preferably, the polymer is maintained at a temperature below 210 at the point at which the N-vinylimidazole is introduced. A temperature of no more than 210 is also preferred at the point at which the free radical initiator is introduced. The residence time during which the polymer is undergoing functionalization in the extruder is on the order of seconds or minutes, rather than hours, as is the case for prior art solution functionalization processes.

The amount of free radical polymerization initiator is suitably chosen to balance the production of the necessary grafting sites on the substrate polymer (and thereby the number of grafted chains), and the chain-length of the grafted chains, amounts within the range of about 0.05 and about 0.15 wt. %, with about 0.1 wt. %, based on the weight of substrate polymer, being generally suitable.

The grafted polymers of this invention are of particular value as multifunctional dispersant VI improver ("DVII") additives for lubricating oils. Hence a further embodiment of the invention provides a lubricating oil composition comprising a major amount of oil of lubricating viscosity and a minor proportion, suitably from 0.15 to 20 wt. %, of the grafted polymer.

The lubricating oil compositions of the present invention comprise a major amount of an oil of lubricating viscosity. Oils of lubricating viscosity useful in the context of the present invention may be selected from natural lubricating oils, synthetic lubricating oils and mixtures thereof. The lubricating oil may range in viscosity from light distillate mineral oils to heavy lubricating oils such as gasoline engine oils, mineral lubricating oils and heavy duty diesel oils. Generally, the viscosity of the oil ranges from about 2 centistokes to about 40 centistokes, especially from about 4 centistokes to about 20 centistokes, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly (1-decenes)); alkylbenzenes (e.g., dodecylbenzenes, tetradecylbenzenes, dinonylbenzenes, di(2-ethylhexyl) benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene-oxide, and the alkyl and aryl ethers of polyoxyalkylene polymers (e.g., methyl-polyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$–$C_3$ fatty acid esters and $C_{13}$ oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly (methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

Unrefined, refined and re-refined oils can be used in lubricants of the present invention. Unrefined oils are those obtained directly from a natural or synthetic source without further purification treatment. For example, a shale oil obtained directly from retorting operations; petroleum oil obtained directly from distillation; or ester oil obtained directly from an esterification and used without further treatment would be an unrefined oil. Refined oils are similar to unrefined oils except that the oil is further treated in one or more purification steps to improve one or more properties. Many such purification techniques, such as distillation, solvent extraction, acid or base extraction, filtration and percolation are known to those skilled in the art. Re-refined oils are obtained by processes similar to those used to provide refined oils but begin with oil that has already been used in service. Such re-refined oils are also known as reclaimed or reprocessed oils and are often subjected to additional processing using techniques for removing spent additives and oil breakdown products.

The copolymers which are being functionalized in the present invention have long been used in lubricating oil compositions as non-dispersive viscosity index improvers (VII). As referred to above, when one of these polymers is replaced by a nitrogen-functionalized equivalent, the amount of ashless dispersant in the formulation can be decreased by at least about 25 percent depending upon the amount of dispersant-viscosity index improver (DVII) used in the oil composition.

Any of the ashless dispersants which are normally used in lubricating oil compositions of this type can be used in the present invention. Typically, these ashless dispersants are relatively low molecular weight polyolefins which have been functionalized by chlorination or maleation with or without subsequent condensations being done through the succinic anhydride. Typical polyolefins used are ethylene copolymers, polybutenes and polyisobutenes having a number average molecular weight between about 500 and 5000. The succinic anhydride derivative of the polyolefin can be made from the chlorinated polyolefin or via a peroxide grafting reaction. Typical further derivatization reactions are esterification with polyhydric alcohols, such as pentaerythritol, or amidization with polyamines, such as polyethylene polyamines.

In addition to dispersants, other additives may also be incorporated in the lubricating oil compositions of the invention to enable them to meet particular requirements. Examples of additives which may be included in the lubricating oil compositions are detergents, metal rust inhibitors, viscosity index improvers, corrosion inhibitors, oxidation inhibitors, friction modifiers, anti-foaming agents, anti-wear agents and pour point depressants. Some are discussed in further detail below.

Metal-containing or ash-forming detergents function both as detergents to reduce or remove deposits and as acid neutralizers or rust inhibitors, thereby reducing wear and corrosion and extending engine life. Detergents generally comprise a polar head with a long hydrophobic tail, with the polar head comprising a metal salt of an acidic organic compound. The salts may contain a substantially stoichiometric amount of the metal in which case they are usually described as normal or neutral salts, and would typically have a total base number or TBN (as can be measured by ASTM D2896) of from 0 to 80. A large amount of a metal base may be incorporated by reacting excess metal compound (e.g., an oxide or hydroxide) with an acidic gas (e.g., carbon dioxide). The resulting overbased detergent comprises neutralized detergent as the outer layer of a metal base (e.g. carbonate) micelle. Such overbased detergents may have a TBN of 150 or greater, and typically will have a TBN of from 250 to 450 or more.

Detergents that may be used include oil-soluble neutral and overbased sulfonates, phenates, sulfurized phenates, thiophosphonates, salicylates, and naphthenates and other oil-soluble carboxylates of a metal, particularly the alkali or alkaline earth metals, e.g., sodium, potassium, lithium, calcium, and magnesium. The most commonly used metals are calcium and magnesium, which may both be present in detergents used in a lubricant, and mixtures of calcium and/or magnesium with sodium. Particularly convenient metal detergents are neutral and overbased calcium sulfonates having TBN of from 20 to 450 TBN, and neutral and overbased calcium phenates and sulfurized phenates having TBN of from 50 to 450. Combinations of detergents, whether overbased or neutral or both, may be used.

Sulfonates may be prepared from sulfonic acids which are typically obtained by the sulfonation of alkyl substituted aromatic hydrocarbons such as those obtained from the fractionation of petroleum or by the alkylation of aromatic hydrocarbons. Examples included those obtained by alkylating benzene, toluene, xylene, naphthalene, diphenyl or their halogen derivatives such as chlorobenzene, chlorotoluene and chloronaphthalene. The alkylation may be carried out in the presence of a catalyst with alkylating agents having from about 3 to more than 70 carbon atoms. The alkaryl sulfonates usually contain from about 9 to about 80 or more carbon atoms, preferably from about 16 to about 60 carbon atoms per alkyl substituted aromatic moiety.

The oil soluble sulfonates or alkaryl sulfonic acids may be neutralized with oxides, hydroxides, alkoxides, carbonates, carboxylate, sulfides, hydrosulfides, nitrates, borates and ethers of the metal. The amount of metal compound is chosen having regard to the desired TBN of the final product but typically ranges from about 100 to 220 wt. % (preferably at least 125 wt. %) of that stoichiometrically required.

Metal salts of phenols and sulfurized phenols are prepared by reaction with an appropriate metal compound such as an oxide or hydroxide and neutral or overbased products may be obtained by methods well known in the art. Sulfurized phenols may be prepared by reacting a phenol with sulfur or a sulfur containing compound such as hydrogen sulfide, sulfur monohalide or sulfur dihalide, to form products which are generally mixtures of compounds in which 2 or more phenols are bridged by sulfur containing bridges.

Dihydrocarbyl dithiophosphate metal salts are frequently used as antiwear and antioxidant agents. The metal may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

The preferred zinc dihydrocarbyl dithiophosphates are oil soluble salts of dihydrocarbyl dithiophosphoric acids and may be represented by the following formula:

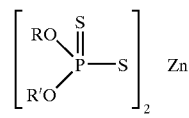

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be about 5 or greater. The zinc dihydrocarbyl dithiophosphate can therefore comprise zinc dialkyl dithiophosphates. The present invention may be particularly useful when used with lubricant compositions containing phosphorus levels of from about 0.02 to about 0.12 wt. %, preferably from about 0.03 to about 0.10 wt. %, most preferably from about 0.05 to about 0.08 wt. %, based on the total weight of the composition.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons, phosphorous esters, metal thiocarbamates, oil soluble copper compounds as described in U.S. Pat. No. 4,867,890, and molybdenum-containing compounds.

Aromatic amines constitute another class of compounds that is frequently used for antioxidancy. Typical oil soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —SO$_2$— or alkylene group) and two are directly attached to one amine nitrogen also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. The amount of any such oil soluble aromatic amines having at least two aromatic groups attached directly to one amine nitrogen should preferably not exceed 0.4 wt. % active ingredient.

Other known friction modifiers comprise oil-soluble organo-molybdenum compounds. Such organo-molybdenum friction modifiers also provide antioxidant and antiwear credits to a lubricating oil composition. As an example of such oil soluble organo-molybdenum compounds, there may be mentioned the dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkaline metal molybdates and other molybdenum salts, e.g., hydrogen sodium molybdate, MoOCl$_4$, MoO$_2$Br$_2$, Mo$_2$O$_3$Cl$_6$, molybdenum trioxide or similar acidic molybdenum compounds.

Among the molybdenum compounds useful in the compositions of this invention are organo-molybdenum compounds of the formula

and

wherein R is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Another group of organo-molybdenum compounds useful in the lubricating compositions of this invention are tri-nuclear molybdenum compounds, especially those of the formula MO$_3$S$_k$L$_n$Q$_z$ and mixtures thereof wherein the L are independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms should be present among all the ligands' organo groups, such as at least 25, at least 30, or at least 35 carbon atoms.

The ligands are independently selected from the group of

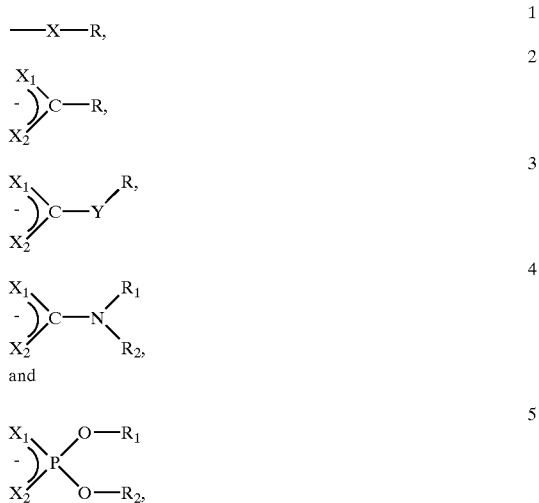

and mixtures thereof, wherein X, X$_1$, X$_2$, and Y are independently selected from the group of oxygen and sulfur, and wherein R$_1$, R$_2$, and R are independently selected from hydrogen and organo groups that may be the same or different. Preferably, the organo groups are hydrocarbyl groups such as alkyl (e.g., in which the carbon atom attached to the remainder of the ligand is primary or secondary), aryl, substituted aryl and ether groups. More preferably, each ligand has the same hydrocarbyl group.

The term "hydrocarbyl" denotes a substituent having carbon atoms directly attached to the remainder of the ligand and is predominantly hydrocarbyl in character within the context of this invention. Such substituents include the following:

1. Hydrocarbon substituents, that is, aliphatic (for example alkyl or alkenyl), alicyclic (for example cycloalkyl or cycloalkenyl) substituents, aromatic-, aliphatic- and alicyclic-substituted aromatic nuclei and the like, as well as cyclic substituents wherein the ring is completed through another portion of the ligand (that is, any two indicated substituents may together form an alicyclic group).

2. Substituted hydrocarbon substituents, that is, those containing non-hydrocarbon groups which, in the context of this invention, do not alter the predominantly hydrocarbyl character of the substituent. Those skilled in the art will be aware of suitable groups (e.g., halo, especially chloro and fluoro, amino, alkoxyl, mercapto, alkylmercapto, nitro, nitroso, sulfoxy, etc.).

3. Hetero substituents, that is, substituents which, while predominantly hydrocarbon in character within the context of this invention, contain atoms other than carbon present in a chain or ring otherwise composed of carbon atoms.

Importantly, the organo groups of the ligands have a sufficient number of carbon atoms to render the compound soluble or dispersible in the oil. For example, the number of carbon atoms in each group will generally range between about 1 to about 100, preferably from about 1 to about 30, and more preferably between about 4 to about 20. Preferred ligands include dialkyldithiophosphate, alkylxanthate, and dialkyldithiocarbamate, and of these dialkyldithiocarbamate is more preferred. Organic ligands containing two or more of the above functionalities are also capable of serving as ligands and binding to one or more of the cores. Those skilled in the art will realize that formation of the compounds of the present invention requires selection of ligands having the appropriate charge to balance the core's charge.

Compounds having the formula $MO_3S_kL_nQ_z$ have cationic cores surrounded by anionic ligands and are represented by structures such as

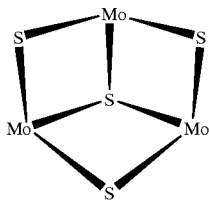

6 and

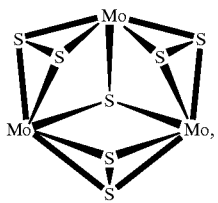

7 and have net charges of +4. Consequently, in order to solubilize these cores the total charge among all the ligands must be −4. Four monoanionic ligands are preferred. Without wishing to be bound by any theory, it is believed that two or more trinuclear cores may be bound or interconnected by means of one or more ligands and the ligands may be multidentate. Such structures fall within the scope of this invention. This includes the case of a multidentate ligand having multiple connections to a single core. It is believed that oxygen and/or selenium may be substituted for sulfur in the core(s).

Oil-soluble or dispersible trinuclear molybdenum compounds can be prepared by reacting in the appropriate liquid(s)/solvent(s) a molybdenum source such as $(NH_4)_2Mo_3S_{13}.n(H_2O)$, where n varies between 0 and 2 and includes non-stoichiometric values, with a suitable ligand source such as a tetralkylthiuram disulfide. Other oil-soluble or dispersible trinuclear molybdenum compounds can be formed during a reaction in the appropriate solvent(s) of a molybdenum source such as of $(NH_4)_2Mo_3S_{13}.n(H_2O)$, a ligand source such as tetralkylthiuram disulfide, dialkyldithiocarbamate, or dialkyldithiophosphate, and a sulfur abstracting agent such cyanide ions, sulfite ions, or substituted phosphines. Alternatively, a trinuclear molybdenum-sulfur halide salt such as $[M']_2[Mo_3S_7A_6]$, where M' is a counter ion, and A is a halogen such as Cl, Br, or I, may be reacted with a ligand source such as a dialkyldithiocarbamate or dialkyldithiophosphate in the appropriate liquid(s)/solvent(s) to form an oil-soluble or dispersible trinuclear molybdenum compound. The appropriate liquid/solvent may be, for example, aqueous or organic.

A compound's oil solubility or dispersibility may be influenced by the number of carbon atoms in the ligand's organo groups. In the compounds of the present invention, at least 21 total carbon atoms should be present among all the ligand's organo groups. Preferably, the ligand source chosen has a sufficient number of carbon atoms in its organo groups to render the compound soluble or dispersible in the lubricating composition.

The terms "oil-soluble" or "dispersible" used herein do not necessarily indicate that the compounds or additives are soluble, dissolvable, miscible, or capable of being suspended in the oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

The molybdenum compound is preferably an organomolybdenum compound. Moreover, the molybdenum compound is preferably selected from the group consisting of a molybdenum dithiocarbamate (MoDTC), molybdenum dithiophosphate, molybdenum dithiophosphinate, molybdenum xanthate, molybdenum thioxanthate, molybdenum sulfide and mixtures thereof. Most preferably, the molybdenum compound is present as molybdenum dithiocarbamate. The molybdenum compound may also be a trinuclear molybdenum compound.

In addition to the dispersant-viscosity index improver (DVII) of the invention, the lubricating oil may also contain an amount of a non-dispersant-viscosity index improver (VII). Representative examples of suitable VII materials are polyisobutylene, copolymers of ethylene and propylene, polymethacrylates, methacrylate copolymers, copolymers of an unsaturated dicarboxylic acid and a vinyl compound, interpolymers of styrene and acrylic esters, and hydrogenated copolymers of styrene/isoprene, styrene/butadiene, and isoprene/butadiene, as well as the partially hydrogenated homopolymers of butadiene and isoprene.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates. Foam control can be provided by an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and need not be further elaborated herein.

In the present invention it may be necessary to include an additive which maintains the stability of the viscosity of the blend. Thus, although polar group-containing additives achieve a suitably low viscosity in the pre-blending stage it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

When lubricating compositions contain one or more of the above-mentioned additives, each additive is typically blended into the base oil in an amount that enables the additive to provide its desired function.

It may be desirable, although not essential, to prepare one or more additive concentrates comprising additives (concentrates sometimes being referred to as additive packages) whereby several additives can be added simultaneously to the oil to form the lubricating oil composition.

The final lubricant composition may employ from 5 to 25 mass %, preferably 5 to 18 mass %, typically 10 to 15 mass % of the concentrate, the remainder being oil of lubricating viscosity.

When lubricating compositions contain one or more of the above-mentioned additives, each additive is typically blended into the base oil in an amount that enables the additive to provide its desired function. Representative effective amounts of such additives, when used in crankcase lubricants, are listed below. All the values listed are stated as mass percent active ingredient.

| ADDITIVE | MASS % (Broad) | MASS % (Preferred) |
| --- | --- | --- |
| Ashless Dispersant | 0.1–20 | 1–8 |
| Metal Detergents | 0.1–15 | 0.2–9 |
| Corrosion Inhibitor | 0–5 | 0–1.5 |
| Metal Dihydrocarbyl Dithiophosphate | 0.1–6 | 0.1–4 |
| Antioxidant | 0–5 | 0.01–2 |
| Pour Point Depressant | 0.01–5 | 0.01–1.5 |
| Antifoaming Agent | 0–5 | 0.001–0.15 |
| Supplemental Antiwear Agents | 0–1.0 | 0–0.5 |
| Friction Modifier | 0–5 | 0–1.5 |
| Viscosity Modifier | 0.01–10 | 0.25–3 |
| Basestock | Balance | Balance |

All weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted.

EXAMPLE 1 (COMPARATIVE)

A hydrogenated polyisoprene-polystyrene block copolymer, having a total molecular weight of 110,000 and a styrene content of 35 wt. % was functionalized using N-vinyl imidazole monomer and peroxide free radical initiator Lupersol 101™. No amide was used. A 133 mm Werner Pfleiderer ZSK twin screw extruder was used for the functionalization process. Polymer crumb was loaded into the extruder feed hopper at a rate of 4,000 pounds per hour. Downstream from polymer feed entry, where polymer melting occurs, N-vinyl imidazole was fed into the extruder at a feed rate of 63 pounds/hour. A solution of 50 parts by weight Lupersol 101™ to 50 parts by weight oil was fed into the extruder at another injection port at 7.2 pounds per hour. Except for in the initial extruder zone, in which the polymer was being heated and had not reached equilibrium melt temperature, the temperature during functionalization was maintained at 232° C. at a screw speed of 350 rpm. Byproducts and unreacted monomer were removed through a reaction vent maintained under partial vacuum. The resulting functionalized polymer melt was forced through a die plate and pelletized. The pellets were subsequently de-watered, dried, and packaged. The resulting product contained 2300 ppm nitrogen. While this material could be packaged, the pellets quickly aggregated in storage and were no longer smooth flowing.

EXAMPLE 2 (INVENTIVE)

A hydrogenated polyisoprene-polystyrene block copolymer, having a total molecular weight of 110,000 and a styrene content of 35 wt. % was pre-mixed by grinding with 1% weight oleamide. This mixture was then functionalized using N-vinyl imidazole monomer and peroxide free radical initiator Lupersol 101™. A 133 mm Werner Pfleiderer ZSK extruder was used for the functionalization process. The polymer-oleamide was loaded into the extruder feed hopper at a rate of 4,000 pounds per hour. N-vinyl imidazole was fed into the extruder at a feed rate of 90 pounds/hour. A solution of 50 parts by weight Lupersol 101™ to 50 parts by weight oil, was fed into the extruder at another injection port further downstream at a rate of 8 pounds per hour. Except for in the initial extruder zone, in which the polymer was being heated and had not reached equilibrium melt temperature, the temperature during functionalization was maintained at 232° C. (plus or minus 2 degrees) at a screw speed of 350 rpm. Byproducts and unreacted monomer were removed through a reaction vent, which was maintained under partial vacuum. The resulting functionalized polymer melt was forced through a die plate and pelletized. The pellets were subsequently de-watered, dried, and packaged. The resulting product contained 2300 ppm nitrogen. Unlike Example 1, this material could easily be packaged; the pellets did not aggregate and contained no haze. The pellets remained free flowing, even after extended storage at room temperature.

EXAMPLE 2 (INVENTIVE)

Concentrates were prepared using the functionalized polymers of Examples 1 and 2. The concentrates of Example 3 contained 6 wt. % of the functionalized polymer of Example 1 in 94 wt. % base oil. The concentrate of Example 4 contained 6 wt. % of the functionalized polymer of Example 2 in 94 wt. % of base oil (wt. % being based on the total weight of the concentrates).

With fresh samples of the concentrate of Example 3 it was possible to prepare finished motor oil having satisfactory rheological properties except for the measurement of high shear rate viscosity in the tapered bearing simulator (ASTM D4683). However, upon long-term ambient storage, the concentrate of Example 3 became gelled. Microgel formation occurred due to crosslinked polymer segments formed during the extruder process. Such a concentrate provides a time dependent, variable thickening efficiency to formulated oils and cannot therefore be used in a commercial application. No such gelling was observed with the concentrate of Example 4 after long term ambient storage under identical conditions.

EXAMPLE 5 (COMPARATIVE)

A concentrate was prepared using 6 wt. % of a non-dispersant viscosity modifier comprising an unfunctionalized hydrogenated polyisoprene-polystyrene block copolymer having the same polymer molecular weight and styrene content as the polymers of Examples 1 and 2, and 94 wt. % of the same diluent oil used in Examples 3 and 4.

thickening efficiency as measured by high shear viscosity at 150° C. Example 8, shows that the multigrade oil containing the functionalized polymer prepared according to Inventive Example 2, meets all requirements.

TABLE 2

| Ex. | SAE Grade | Kin. Vis, cSt 100° C. | CCS, -20° C., cP | CCS, -25° C., cP | High shear vis, cP, 150° C. | Min. high shear vis cP |
|---|---|---|---|---|---|---|
| 6 | 5W-30 | 11.91 | — | 3470 | 2.82 | 2.90 |
| 7 | 10W-30 | 11.97 | 3320 | — | 3.04 | 2.90 |
| 8 | 5W-30 | 11.94 | — | 3330 | 2.93 | 2.90 |
| 9 | 10W-30 | 11.64 | 3300 | — | 3.11 | 2.90 |

EXAMPLES 6 THROUGH 9

SAE 5W-30 Multigrade engine oil formulations were prepared using the concentrates of Example 3, Example 4 and Example 5 together with Group 2 base oil(s), an ashless dispersant, and a passenger car motor oil additive package that contained all component additives conventionally needed to formulate a lubricating oil, except for ashless dispersant, viscosity index improver and pour point depressant. The additive package and ashless dispersant, when used in sufficient quantities, provide a passenger car motor oil which meets API SJ/CF performance specifications. To achieve passing engine test performance using the non-dispersant viscosity modifier such as that contained in Example 5, it was necessary to use 6 wt. % of the ashless dispersant and 4 wt. % of the additive package. Multigrade SAE 10W-30 blends were prepared using these additives together with a pour point depressant, and the functionalized polymer oil concentrates from Examples 3 and 4. The concentration of ashless dispersant was reduced from 6 wt. % 3 wt. % on the assumption that much of the ashless dispersant could be backed out of the formulation if the dispersant viscosity index improver was substituted for a non-dispersant viscosity index improver.

TABLE 1

| Components/ SAE Grade | Example 6 wt. %/grade | Example 7 wt. %/grade | Example 8 wt. %/grade | Example 9 wt. %/grade |
|---|---|---|---|---|
| Base Oil | 71.79 | 79.29 | 71.79 | 79.29 |
| Pour Point Dep. | 0.20 | 0.20 | 0.20 | 0.20 |
| Ashless Disp. | 3.00 | 3.00 | 3.00 | 3.00 |
| Adpack | 4.00 | 4.00 | 4.00 | 4.00 |
| Ex. 3 Conc. | 21.00. | 13.50 | | |
| Ex. 4 Conc. | | | 21.00 | 13.50 |
| SAE Grade | 5W-30 | 10W-30 | 5W-30 | 10W-30 |

For SAE 5W-30 and 10W-30 oil, the kinematic viscosity must be between 9.3 and less than 12.5 cSt. The CCS viscosity must be no greater than 3500 cP as measured at −20° C. for 10W grades and −25° C. for 5W grades. Measured rheological popertes for Examples 6–9 are given in Table 2. Example 6 does not meet SAE 5W-30 high shear viscosity requirements per SAE Standard J300, revision APR97. The functionalized polymer, prepared according to Comparative Example 1, does not provide the lubricating oil composition with the necessary balance of contribution to thickening efficiency at 100° C. (kinematic viscosity) and

EXAMPLES 10 and 11

SAE 10W-30 engine oils were blended to define the dispersant credit activity of the functionalized polymer of Example 2. Formulations were prepared, as shown in Table 3:

TABLE 3

| Components | Example 10 wt. % components | Example 11 wt. % components |
|---|---|---|
| Base Oil 1 (100N) | 56.6 | 42.1 |
| Base Oil 2 (325N) | 33.2 | 36.4 |
| Pour Point Depressant | 0.2 | 0.2 |
| Dispersant | 6.0 | 4.5 |
| Additive Package | 4.0 | 4.0 |
| Example 5 Conc. | 10.8 | |
| Example 4 Conc. | | 12.8 |

The above oil formulations was tested in the Sequence V-E engine test, which is a measure of the oil's ability to retard varnish and sludge build up. Rheology tests that establish the SAE 10W-30 Grade are given in Table 4. Engine test results are in Table 5.

TABLE 4

| Ex. No. | Kin. Vis., cSt, 100° C. | CCS Vis, cP, −20° C. | High Shear Vis, cP, 150° C. |
|---|---|---|---|
| 10 | 10.55 | 3180 | 3.14 |
| 11 | 10.48 | 3070 | 3.07 |

Both Examples of Table 4 meet SAE Standard J300 requirements for kinematic viscosity, CCS viscosity and high shear viscosity. As can be seen from Table 3, the use of the concentrate containing the functionalized polymer and a reduced amount of ashless dispersant allowed the targets to be met by fully-formulated oils containing a greater proportion of the more viscous, less volatile 325N base oil, and less of the more volatile, less viscous 100N base oil. The benefit is less in-service oil consumption for the formulations of Example 11 relative to that of Example 10.

TABLE 5

| Sequence V-E Ratings | Ex. 10 | Ex. 11 | Passing Limits |
|---|---|---|---|
| Average engine sludge | 9.09 | 9.02 | 9.0 min |
| Rocker Cover sludge | 8.39 | 8.28 | 7.0 min. |
| Average engine varnish | 5.37 | 6.15 | 5.0 min |
| Piston Skirt Varnish | 6.84 | 7.48 | 6.5 min. |

TABLE 5-continued

| Sequence V-E Ratings | Ex. 10 | Ex. 11 | Passing Limits |
|---|---|---|---|
| Av. cam wear, micron | 13 | 14 | <127 |
| Max cam wear, micron | 55 | 55 | <380 |

As shown by the above data, substitution of the oil concentrate of Example 4, which contained the functionalized polymer of Example 2, for the oil concentrate of Example 5, which contained the corresponding non-functionalized polymer, resulted in a passing Sequence V-E engine test with a formulation that contained only 4.5% ashless dispersant. This represents a 25% reduction relative to the formulation of Example 10.

EXAMPLE 12

A hydrogenated polyisoprene-polystyrene block copolymer, having a total molecular weight of 110,000 and a styrene content of 35 wt. % was pre-mixed, 50/50 parts by weight, with a hydrogenated tapered block copolymer having a total molecular weight of 210,000 and a polystyrene content of 6 wt. %. 1 wt. % of oleamide was ground into the polymer mixture. The mixture was then functionalized using N-vinyl imidazole monomer and peroxide free radical initiator Lupersol 101™. A 133 mm Werner Pfleiderer ZSK extruder was used for the functionalization process. The polymer-oleamide was loaded into the feed hopper of the extruder at a rate of 4,000 pounds per hour. N-vinyl imidazole was fed into the extruder at a feed rate of 74 pounds/hour. A solution of 50 parts by weight of Lupersol 101™ to 50 parts by weight oil, was fed into the extruder at a downstream injection at a rate of 6.2 pounds per hour. Except for in the initial extruder zone, in which the polymer was being heated and had not reached equilibrium melt temperature, the temperature during functionalization was maintained at 238° C. (plus or minus 3 degrees) at a screw speed of 350 rpm. Byproducts and unreacted monomer were removed through a reaction vent maintained under partial vacuum. The resulting functionalized polymer melt was forced through a die plate and pelletized. The pellets were subsequently de-watered, dried, and packaged. The resulting product contained 1400 ppm nitrogen. Unlike Example 1, this material could be packaged easily, the pellets did not aggregate and the product contained no haze. The pellets were free-flowing, even after extended storage at room temperature.

EXAMPLE 13

The functionalized polyisoprene-polystyrene block copolymer, described in Example 12, was used to prepare a 6 wt. % concentrate in diluent oil.

EXAMPLES 14 and 15

SAE 5W-30 Multigrade engine oil formulations were prepared using the concentrate of Example 13, together with Group 2 base oil(s), an ashless dispersant, and a passenger car motor oil additive package that contained all component additives conventionally needed to formulate a lubricating oil, except for ashless dispersant, viscosity index improver and pour point depressant. The additive package and ashless dispersant, when used in sufficient quantities, provide a passenger car motor oil which meets API SJ/CF performance specifications. To achieve passing engine test performance using the non-dispersant viscosity modifier such as that contained in Example 5, it was necessary to use 6 wt. % of the ashless dispersant and 4 wt. % of the additive package. Multigrade SAE 10W-30 blends were prepared using these additives together with a pour point depressant, and the functionalized polymer oil concentrates from Example 13. The concentration of ashless dispersant was reduced from 6 wt. % 3 wt. % on the assumption that much of the ashless dispersant could be backed out of the formulation if the dispersant viscosity index improver substituted for a non-dispersant viscosity index improver.

TABLE 6

| Components or SAE Grade Target | Example 14 wt. % component/grade | Example 15 wt. % component/grade |
|---|---|---|
| Base Oil 325N | 10.26 | 42.82 |
| Base Oil 100N | 63.03 | 37.97 |
| Pour Point Depressant | 0.20 | 0.20 |
| Dispersant | 3.00 | 3.00 |
| Additive Package | 4.00 | 4.00 |
| DVII conc. | 19.50 | 12.00 |
| SAE Grade | 5W-30 | 10W-30 |

The results set forth in Table 7 show that the formulations of Examples 14 and 15 meet SAE J300 requirements. The SAE 5W-30 grade, meets the high shear viscosity requirement at 150° C., which was not possible with the SAE 5W-30 formulation of Example 6, which contained the functionalized polymer of Comparative Example 1.

TABLE 7

| Ex. | Kin. Vis., cSt, 100° C. | CCS Vis, cP, −20° C. | High Shear Vis, cP, 150° C. |
|---|---|---|---|
| 14 | 11.71 | 3350 | 3.05 |
| 15 | 10.80 | 3330 | 3.09 |

The disclosures of all patents, articles and other materials described herein are hereby incorporated, in their entirety, into this specification by reference. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A process for preparing a grafted polymer comprising graft-reacting a substrate polymer and a nitrogen-containing grafting monomer in the presence of a free radical initiator and an amide coupling inhibitor selected from the group consisting of primary amides of saturated and unsaturated fatty acids, wherein said coupling inhibitor is present in an amount sufficient to reduce polymer crosslinking during the graft reaction.

2. The process according to claim 1, wherein said amide coupling inhibitor is selected from the group consisting of stearamide, palmitamide, oleamide and mixtures thereof.

3. The process according to claim 1, wherein said graft reaction is performed in an extruder.

4. The process according to claim 1, wherein said substrate polymer is selected from hydrogenated linear block copolymers of the formula:

$$A_z-(B-A)_y-B_x$$

wherein:

A is a polymeric block comprising predominantly monoalkenyl aromatic hydrocarbon monomer units;

B is a polymeric block comprising predominantly conjugated diolefin monomer units;

x and z are, independently, a number equal to 0 or 1; and y is a whole number ranging from 1 to about 15;

hydrogenated linear tapered copolymers containing a central tapered segment of the formula:

A—A/B—B wherein:

A is a polymeric block comprising predominantly monoalkenyl aromatic hydrocarbon monomer units;

B is a polymeric block comprising predominantly conjugated diolefin monomer units; and A/B is a tapered segment containing both monoalkenyl aromatic hydrocarbon and conjugated diolefin units;

hydrogenated star polymers having block copolymer arms of the formulae:

$(B_x-(A-B)_y-A_z)_nC;$ and $(B'_x-(A-B)_y-A_z)_{n'}-C(B')_{n''}$ wherein:

A, B, x, y and z are as previously defined;

n is a number from 3 to 30;

C is the core of the radial polymer formed with a polyfunctional coupling agent;

B' is a polymeric block comprising predominantly conjugated diolefin units, which B' may be the same or different from B; and n' and n" are integers representing the number of each type of arm and the sum of n' and n" will be a number from 3 to 30; and mixtures thereof.

5. The process according to claim 4, wherein A is derived from styrene, B is derived from from isoprene, hydrogenation of B is at least 95%.

6. The process according to claim 5, wherein said substrate polymer is a hydrogenated linear block copolymer or a hydrogenated star polymer and A is not hydrogenated.

7. The process according to claim 5, wherein said substrate polymer is a linear copolymer containing a central tapered segment and from about 5 to about 35 wt. % of the styrene in the A and/or A/B segments is hydrogenated.

8. The process according to claim 4, wherein said substrate polymer is a mixture of at least two polymers selected from linear block copolymers, linear tapered copolymers and star copolymers.

9. The process according to claim 8, wherein said linear block copolymers and linear tapered copolymers have a number average molecular weight of from about 85,000 to about 300,000, and said star polymers have a number average molecular weight of from about 350,000 to about 800,000.

10. The process according to claim 1, wherein said nitrogen-containing grafting monomer is N-vinyl imidazole.

11. The process according to claim 10, wherein said nitrogen-containing grafting monomer is present in an amount of from about 0.4 wt. % to about 2.2 wt. %, based on the weight of substrate polymer.

12. The process according to claim 1, wherein said coupling inhibitor is oleamide.

13. The process according to claim 1, wherein said coupling inhibitor is present in an amount of from about 0.4 wt. % to about 2.2 wt. %, based on the weight of substrate polymer.

14. The process according to claim 1, wherein said substrate polymer and a nitrogen-containing grafting monomer are graft reacted in the further presence of diluent oil.

15. A grafted polymer prepared by the process of claim 1.

16. A lubricating oil composition comprising a major amount of an oil of lubricating viscosity and a minor amount of the grafted polymer of claim 15.

17. An oil concentrate comprising an oil of lubricating viscosity and from about 2 wt. % to about 12 wt. % of the grafted polymer of claim 15.

* * * * *